US010295277B2

(12) United States Patent
Giordano

(10) Patent No.: US 10,295,277 B2
(45) Date of Patent: May 21, 2019

(54) SLIDE-ON HEAT EXCHANGER RESTRAINING BRACKET

(71) Applicant: DENSO International America, Inc., Southfield, MI (US)

(72) Inventor: Derek Giordano, West Bloomfield, MI (US)

(73) Assignee: DENSO International America, Inc., Southfield, MI (US)

(*) Notice: Subject to any disclaimer, the term of this patent is extended or adjusted under 35 U.S.C. 154(b) by 233 days.

(21) Appl. No.: 14/732,094

(22) Filed: Jun. 5, 2015

(65) Prior Publication Data

US 2016/0356557 A1    Dec. 8, 2016

(51) Int. Cl.
*B60K 11/04*    (2006.01)
*F28F 9/00*    (2006.01)
*F28D 1/04*    (2006.01)

(52) U.S. Cl.
CPC .............. *F28F 9/002* (2013.01); *B60K 11/04* (2013.01); *F28D 1/0435* (2013.01); *F28F 2009/004* (2013.01)

(58) Field of Classification Search
USPC ......... 248/200, 213.3, 232, 213, 213.4, 233; 180/68.4, 68.6
See application file for complete search history.

(56) References Cited

U.S. PATENT DOCUMENTS

| 5,205,349 | A | 4/1993 | Nagao et al. | |
| 5,348,079 | A | 9/1994 | Tanaka | |
| 6,513,579 | B1 * | 2/2003 | Kent | F28F 9/002 |
| | | | | 165/67 |
| 6,675,921 | B2 * | 1/2004 | Brown | B60K 11/04 |
| | | | | 165/67 |
| 6,901,992 | B2 | 6/2005 | Kent et al. | |
| 7,108,092 | B2 * | 9/2006 | Suwa | B60K 11/04 |
| | | | | 180/68.4 |
| 8,678,119 | B2 * | 3/2014 | Singh | H01M 10/625 |
| | | | | 180/68.4 |
| 8,827,224 | B2 | 9/2014 | Vanderwees | |
| 2002/0157885 | A1 | 10/2002 | Brown | |
| 2004/0195020 | A1 | 10/2004 | Suwa et al. | |

FOREIGN PATENT DOCUMENTS

| DE | 10297210 T5 | 9/2004 | |
| DE | 102008047077 A1 | 6/2009 | |
| EP | 2540545 A1 | 1/2013 | |
| FR | 2822126 A1 | 9/2002 | |
| WO | WO-2013058242 A1 * | 4/2013 | ............ F28F 9/002 |

* cited by examiner

*Primary Examiner* — Alfred J Wujciak
(74) *Attorney, Agent, or Firm* — Harness, Dickey & Pierce, P.L.C.

(57) ABSTRACT

The present teachings provide for a bracket for a heat exchanger assembly including a first heat exchanger, a second heat exchanger, and a third heat exchanger. The bracket can include a first landing, a second landing, a bridge member and a retention member. The first landing can be configured to be fixedly coupled to the first heat exchanger. The second landing can define a first aperture that can be configured to receive a first fastener through the second landing. The bridge member can be fixedly coupled to the first and second landings. The retention member can be fixedly coupled to the second landing. The retention member and the second landing can define a slot that can be adapted to receive a portion of the second heat exchanger.

5 Claims, 4 Drawing Sheets

SLIDE-ON HEAT EXCHANGER RESTRAINING BRACKET

FIELD

The present disclosure relates to a slide-on heat exchanger restraining bracket.

BACKGROUND

This section provides background information related to the present disclosure which is not necessarily prior art.

Vehicles having internal combustion engines typically include a plurality of heat exchangers such as a radiator, a condenser, and a transmission fluid cooler for example. These heat exchangers typically remove heat from one or more systems of the vehicle (e.g. an engine cooling system, heating, cooling, and ventilation system ("HVAC"), a transmission cooling system, a power steering cooling system, an oil cooling system) and expel the heat to the atmosphere. In some applications, these heat exchangers are mounted to each other such that air can flow through each heat exchanger in series. In other words, air flows through a first one of the heat exchangers, then through a second one of the heat exchangers, and finally through a third one of the heat exchangers.

Typically, the first two heat exchangers are fixedly coupled together by a first set of fasteners. Then the third heat exchanger is fastened to the second heat exchanger with a second set of fasteners that are separate from the first set of fasteners. This process requires multiple operations, mounting points, and fasteners that can add to the time, complexity, and cost of assembling the vehicle.

SUMMARY

This section provides a general summary of the disclosure, and is not a comprehensive disclosure of its full scope or all of its features.

The present teachings provide for a bracket for a heat exchanger assembly including a first heat exchanger, a second heat exchanger, and a third heat exchanger. The bracket can include a first landing, a second landing, a bridge member and a retention member. The first landing can be configured to be fixedly coupled to the first heat exchanger. The second landing can define a first aperture that can be configured to receive a first fastener through the second landing. The bridge member can be fixedly coupled to the first and second landings. The retention member can be fixedly coupled to the second landing. The retention member and the second landing can define a slot that can be adapted to receive a portion of the second heat exchanger.

The present teachings further provide for a heat exchanger assembly including a first heat exchanger, a second heat exchanger and a bracket. The first heat exchanger can include a first mounting member. The second heat exchanger can include a second mounting member. The second mounting member can define a finger. The bracket can include a first landing, a second landing, a bridge member and a retention member. The first landing can be fixedly coupled to the first mounting member. The bridge member can be fixedly coupled to the first and second landings. The retention member can fixedly couple the second landing. The retention member and the second landing can define a slot. The finger can be received in the slot.

The present teachings further provide for a method of assembling a heat exchanger assembly. The method can include inserting a finger that can be defined by a first mount of a first heat exchanger into a slot that can be defined by a first end of a bracket. The method can include fixedly coupling a second end of the bracket to a second mount of a second heat exchanger.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present teachings are directed toward a heat exchanger assembly including a bracket that can secure two heat exchangers together with only one fastener disposed through the bracket. The bracket further permits a third heat exchanger to be fixedly coupled to the first two heat exchangers with another fastener that extends through the bracket.

Figure 1:
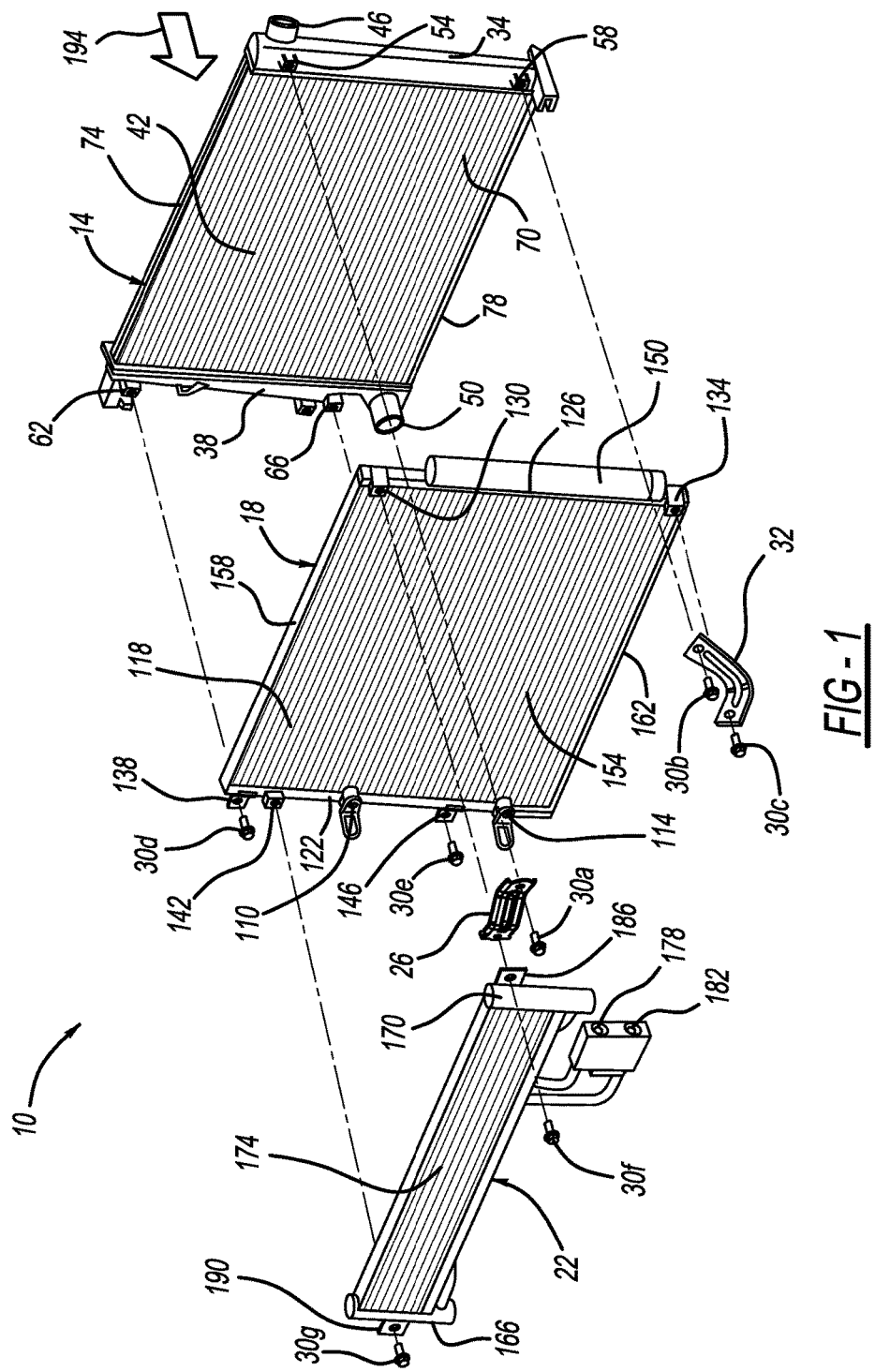
FIG. 1 is an exploded perspective view of a heat exchanger assembly, illustrating a bracket and first, second and third heat exchangers in accordance with the present teachings.

With reference to FIG. 1, an exploded view of a heat exchanger assembly 10 is illustrated. The heat exchanger assembly 10 can include a first heat exchanger 14, a second heat exchanger 18, a third heat exchanger 22, a first bracket 26, and a plurality of fasteners 30a, 30b, 30c, 30d, 30e 30f, 30g. The heat exchanger assembly 10 can also include additional brackets such as a second bracket 32 for example.

The first, second, and third heat exchangers 14, 18, 22, can be fluidly coupled to different systems (e.g. an engine coolant system, heating, ventilation, and air conditioning "HVAC" system, transmission fluid cooling system, power steering cooling system, oil cooling system) of a vehicle in a conventional manner.

In the example provided, the first heat exchanger 14 is an engine radiator that can be fluidly coupled to an engine coolant system to receive a first fluid (e.g. a refrigerant)

therefrom. In the example provided, the second heat exchanger 18 is a condenser that can be fluidly coupled to an HVAC system to receive a second fluid (e.g. a refrigerant) therefrom. In the example provided, the third heat exchanger 22 is a transmission fluid cooler that can be fluidly coupled to a transmission cooling system to receive a third fluid (e.g. transmission fluid) therefrom. It is understood that any of the first, second, and third heat exchangers 14, 18, 22 can alternatively be fluidly coupled to other systems of the vehicle. In the example provided, the first, second, and third heat exchangers 14, 18, 22 are radiator or fin-tube style heat exchangers, though other types of heat exchangers can be used.

The first heat exchanger 14 can include an inlet tank 34, an outlet tank 38, a plurality of first fluid conduits 42, a first inlet 46, a first outlet 50, a first mounting member 54, a second mounting member 58, a third mounting member 62, and a fourth mounting member 66. It is understood that additional or fewer mounting members can be used. The first inlet 46 can be defined by the inlet tank 34 and can be fluidly coupled to the engine cooling system to receive the first fluid therefrom. The first outlet 50 can be defined by the outlet tank 38 and can be fluidly coupled to the engine cooling system to return the first fluid thereto. The first fluid conduits 42 can extend between the inlet and outlet tanks 34, 38 and can be fluidly coupled to the inlet and outlet tanks 34, 38 to fluidly couple the first inlet 46 with the first outlet 50.

While shown extending horizontally between the inlet and outlet tanks 34, 38, it is understood that the first fluid conduits 42 can extend in any suitable path between the inlet tank 34 and the outlet tank 38 such as a serpentine path for example. A plurality of fins can be coupled to and extend between the first fluid conduits 42 to dissipate heat from the first fluid conduits 42 when air flows through the first heat exchanger 14 and between the first fluid conduits 42.

The first and second mounting members 54, 58 can be fixedly coupled to the inlet tank 34 on a rearward side 70 of the first heat exchanger 14. In the example provided, the first mounting member 54 is located proximate to a top 74 of the first heat exchanger 14 and the second mounting member 58 is located proximate to a bottom 78 of the first heat exchanger 14, though other configurations can be used. The third and fourth mounting members 62, 66 can be fixedly coupled to the outlet tank 38 on the rearward side 70 of the first heat exchanger 14. In the example provided, the third mounting member 62 is located proximate to the top 74 of the first heat exchanger 14 and the fourth mounting member 66 is located proximate to the bottom 78 of the first heat exchanger 14.

The second heat exchanger 18 can include a second inlet 110, a second outlet 114, a plurality of second fluid conduits 118, a first frame member 122, a second frame member 126, a fifth mounting member 130, a sixth mounting member 134, a seventh mounting member 138, an eighth mounting member 142, and a ninth mounting member 146. It is understood that additional or fewer mounting members can be used. The second heat exchanger 18 can also include a dehydrator 150 that can be fluidly coupled to the second fluid conduits 118.

In the example provided, the second inlet 110 can be fluidly coupled to the HVAC system to receive the second fluid therefrom. The second outlet 114 can be fluidly coupled to the HVAC system to return the second fluid thereto. The second fluid conduits 118 can fluidly couple the second inlet 110 to the second outlet 114 and can be supported on opposite sides of the second heat exchanger 18 by the first and second frame members 122, 126. While shown extending horizontally between the first and second frame members 122, 126, it is understood that the second fluid conduits 118 can extend in any suitable path between the first and second frame members 122, 126 to fluidly couple the second inlet 110 with the second outlet 114 such as a serpentine path for example. A plurality of fins can be coupled to and extend between the second fluid conduits 118 to dissipate heat from the second fluid conduits 118 when air flows through the second heat exchanger 18 and between the second fluid conduits 118.

The fifth and sixth mounting members 130, 134 can be fixedly coupled to the second frame member 126 on a rearward side 154 of the second heat exchanger 18. The fifth mounting member 130 can be located proximate to a top 158 of the second heat exchanger 18 and the sixth mounting member 134 can be located proximate to a bottom 162 of the second heat exchanger 18. The seventh, eighth, and ninth mounting members 138, 142, 146 can be fixedly coupled to the first frame member 122. The eighth mounting member 142 can be coupled to the second frame member 126 on the rearward side 154 of the second heat exchanger 18 and can be located between the seventh and ninth mounting members 138, 146.

The third heat exchanger 22 can include a third frame member 166, a fourth frame member 170, a plurality of third fluid conduits 174, a third inlet 178, a third outlet 182, a tenth mounting member 186 and an eleventh mounting member 190. It is understood that additional mounting members can be used.

In the example provided, the third inlet 178 can be fluidly coupled to the transmission fluid cooling system to receive the third fluid therefrom. The third outlet 182 can be fluidly coupled to the transmission fluid cooling system to return the third fluid thereto. The third fluid conduits 174 can fluidly couple the third inlet 178 to the third outlet 182 and can be supported on opposite sides of the third heat exchanger 22 by the third and fourth frame members 166, 170. While shown extending horizontally between the third and fourth frame members 166, 170, it is understood that the third fluid conduits 174 can extend in any suitable path between the third and fourth frame members 166, 170 to fluidly couple the third inlet 178 to the third outlet 182 such as a serpentine path for example. A plurality of fins (not specifically shown) can be coupled to and extend between the third fluid conduits 174 to dissipate heat from the third fluid conduits 174 when air flows through the third heat exchanger 22 and between the third fluid conduits 174.

The tenth mounting member 186 can be fixedly coupled to the fourth frame member 170 and the eleventh mounting member 190 can be fixedly coupled to the third frame member 166.

The first, second, and third heat exchangers 14, 18, 22 can be fixedly coupled together such that the first, second, and third fluid conduits 42, 118, 174 are aligned to permit air to flow sequentially through the first second and third heat exchangers 14, 18, 22. In the example provided, air flows in the direction indicated by arrow 194, though other configurations can be used.

A first one of the fasteners 30*a* can fixedly couple the first bracket 26 to the first mounting member 54. The first bracket can be configured, as discussed in greater detail below, to be coupled to the fifth mounting member 130 without the need of one of the fasteners 30*a* 30*b*, 30*c*, 30*d*, 30*e*, 30*f*, 30*g*. A second one of the fasteners 30*b* can fixedly couple the second bracket 32 to the second mounting member 58. A third one of the fasteners 30*c* can fixedly couple the second bracket 32 to the sixth mounting member 134. In the example provided, a fourth one of the fasteners 30d can fixedly couple the seventh mounting member 138 to the third mounting member 62, and a fifth one of the fasteners 30e can fixedly couple the ninth mounting member 146 to the fourth mounting member 66. A sixth one of the fasteners 30f can be received through the first bracket 26 to fixedly couple the tenth mounting member 186 to the fifth mounting member 130. A seventh one of the fasteners 30g can fixedly couple the eleventh mounting member 190 to the eighth mounting member 142.

Figure 2:
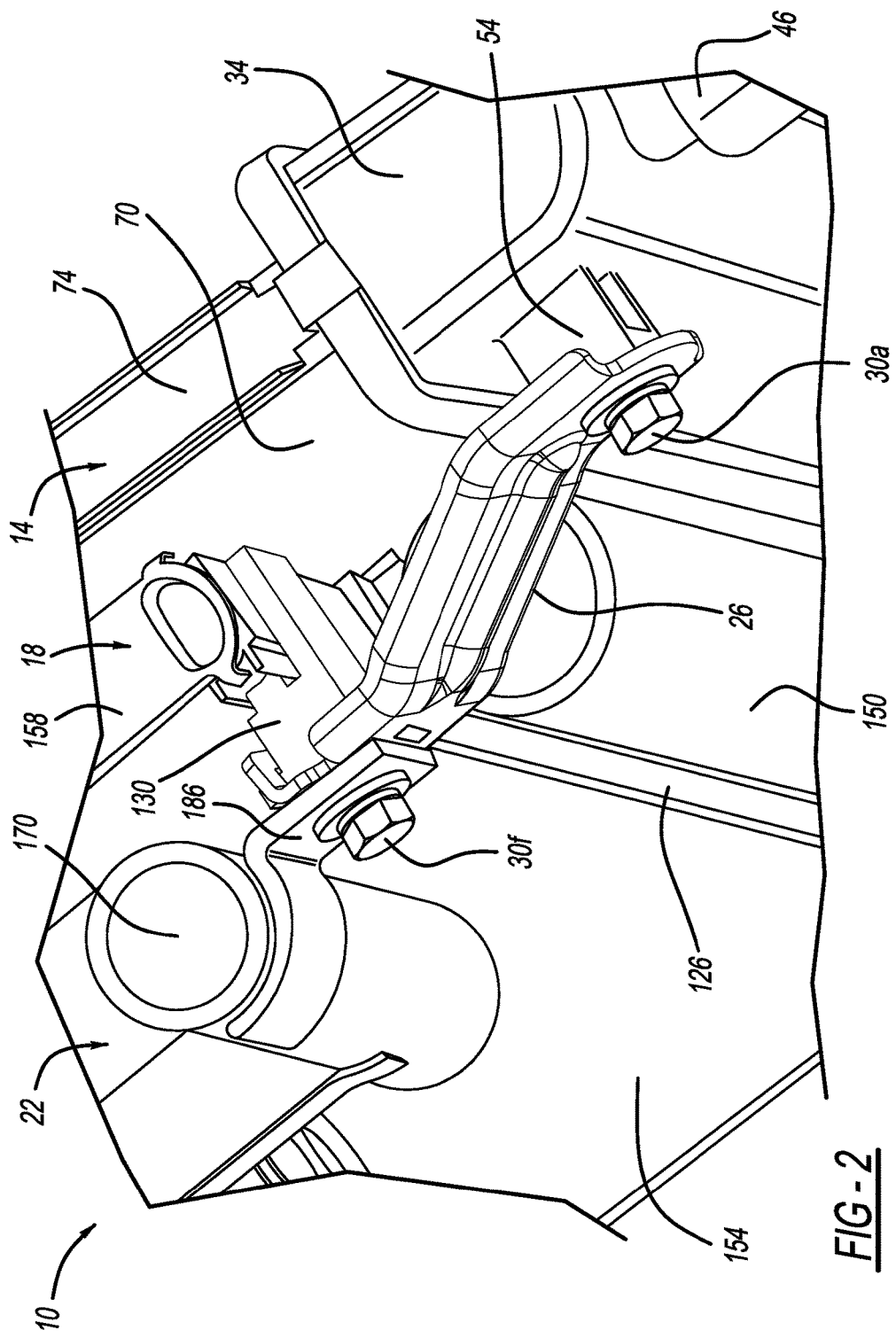
FIG. 2 is a perspective view of a portion of the heat exchanger assembly of FIG. 1, illustrating the bracket mounted to a mounting member of the second heat exchanger.

With additional reference to FIG. 2, a portion of the heat exchanger assembly 10, fully assembled is illustrated. The first mounting member 54 can be fixedly coupled to the inlet tank 34 at a rear side 70 of the first heat exchanger and can extend rearward therefrom. In the example provided, the first mounting member 54 can be integrally formed with the inlet tank 34 or can be a separate body fixedly mounted (e.g. brazed or welded) to the inlet tank 34.

The fifth mounting member 130 can be fixedly coupled to the second frame member 126 at a rearward side 154 of the second heat exchanger 18 and can extend rearward therefrom. In the example provided, the fifth mounting member is a separate body from the second frame member 126 that is fixedly mounted (e.g. brazed or welded) to the second frame member, though other configurations can be used (e.g. integrally formed with the second frame member 126). In the example provided, the fifth mounting member 130 extends rearward of the first mounting member 54 such that the first and fifth mounting members 54, 130 are not level with each other in the rearward direction.

With additional reference to FIGS. 3-6, the first bracket 26, first mounting member 54, and fifth mounting member 130 are illustrated in greater detail and in different stages of assembly. The first bracket 26 can be a unitarily formed body and in the example provided, is formed in a stamping process from a single piece of metal, though other configurations can be used. The first bracket 26 can include a first landing 310, a second landing 314, a bridge member 318, a retention member 322 and a detent 326. The first bracket 26 can also include a pair side skirts 328. The first landing 310 can have a substantially flat first bottom face 330 and can define a first aperture 334 that can extend through the first landing 310.

The second landing 314 can have a substantially flat second bottom face 338 and can define a second aperture 342 that can extend through the second landing 314. The second bottom face 338 can be parallel to and offset from the first bottom face 330 such that the first bottom face 330 is generally below (as oriented in FIGS. 3-6) the second bottom face 338.

The bridge member 318 can extend diagonally between the first and second landings 310, 314 to fixedly couple the first and second landings 310, 314 together. The bridge member 318 can define a ridge 346 that can extend substantially the length of the bridge member 318 and down the longitudinal center of the bridge member 318 to add structural stiffness to the first bracket 26.

The retention member 322 can be fixedly coupled to a terminal end 350 of the second landing 314 and can extend therefrom in a direction that is transverse to the second bottom face 338 (i.e. generally downward in the orientations shown in FIGS. 3-6). The retention member 322 and the terminal end 350 of the second landing 314 can define a slot 354.

The detent 326 can be fixedly coupled to the second landing 314 generally between the second aperture 342 and the bridge member 318. The detent 326 can extend from the second landing 314 in a direction that is transverse to the second bottom face 338 (i.e. generally downward from the second bottom face 338 in the orientations shown in FIGS. 3-6).

The first mounting member 54 can define a first upper face 358, a nut pocket 362, and a third aperture 366. The nut pocket 362 can have a shape that is complementary (e.g. hexagonal or having opposite flat sides) to a nut 370 and opposite from the first upper face 358 such that the nut pocket 362 faces or opposes the inlet tank 34. The third aperture 366 can be coaxial with the nut pocket 362. The nut 370 can be received in the nut pocket 362 and the nut pocket 362 can hold the nut 370 to prevent the nut 370 from rotating. In other words, the nut 370 can slide into the nut pocket 362 between the inlet tank 34 and the first mounting member 54 and the nut 370 can engage the nut pocket 362 to prevent the nut 370 from being rotated. The third aperture 366 can be a diameter configured to receive a threaded portion 374 of the first one of the fasteners 30a through the first upper face 358 and into the nut pocket 362, where the threaded portion 374 can threadably engage the nut 370. Alternatively, the third aperture 366 can be threaded to threadably engage the threaded portion 374 without the need for the nut 370.

The fifth mounting member 130 can define a second upper face 378, a fourth aperture 382, a finger 386, a front face 390, and a back face 394. The fourth aperture 382 can be open at the second upper face 378. The fourth aperture 382 can include a plurality of internal threads that can matingly engage a threaded portion 398 of the sixth one of the fasteners 30f.

The finger 386 can extend outward (e.g. in the direction along arrows 410) from the front face 390. The longitudinal width (e.g. in the direction along arrows 414 shown in FIG. 4) of the finger 386 can be substantially equal to or slightly greater than the longitudinal width of the slot 354. Thus, when the finger 386 is received in the slot 354, the retention member 322 can engage the finger 386 to prevent the fifth mounting member 130 and the second heat exchanger 18 (FIGS. 1 and 2) from moving in the direction along arrows 414 without the need for one of the fasteners 30a, 30b, 30c, 30d, 30e, 30f, 30g.

The lateral width (e.g. in the direction along arrows 418 shown in FIG. 4) of the finger 368 can be substantially equal to or slightly greater than the lateral width of the slot 354. Thus, when the finger 386 is received in the slot 354, the retention member 322 can engage the finger 386 to prevent the fifth mounting member 130 and the second heat exchanger 18 (FIGS. 1 and 2) from moving in the direction along arrows 418 without the need for one of the fasteners 30a, 30b, 30c, 30d, 30e, 30f, 30g.

The distance between the retention member 322 and the detent 326 (e.g. in the direction along arrows 410 shown in FIG. 4) can be substantially equal to or slightly greater than the distance between the front and back faces 390, 394 of the fifth mounting member 130. Thus, when the finger 286 is received in the slot 354 and the second bottom face 338 of the second landing 314 opposes the second upper face 378 of the fifth mounting member 130, the retention member 322 and the detent 326 can engage the front and back faces 390, 394, respectively, to prevent the fifth mounting member 130 and the second heat exchanger 18 (FIGS. 1 and 2) from moving in the direction along arrows 410 without the need for one of the fasteners 30a, 30b, 30c, 30d, 30e, 30f, 30g. Thus, to assemble or remove the first bracket 26 relative to the fifth mounting member 130, the first bracket 26 must be pivoted about the fifth mounting member 130 as best shown in FIG. 3.

Figure 3:
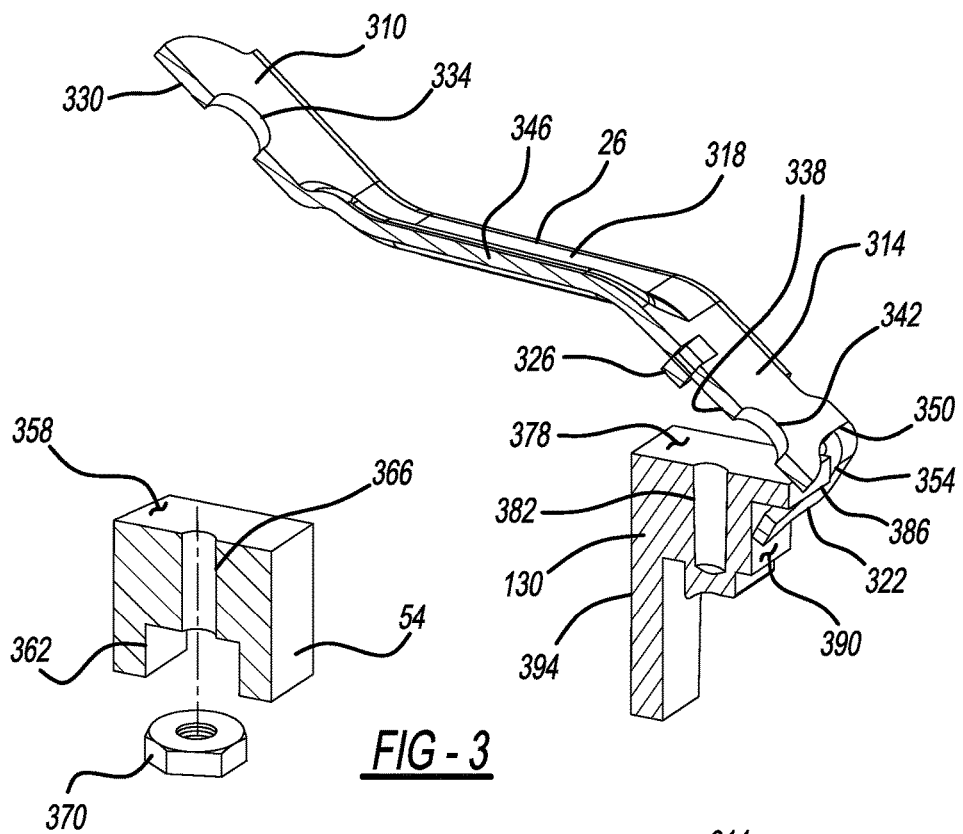
FIG. 3 is a perspective sectional view of a portion of the heat exchanger assembly of FIG. 1, illustrating the bracket in a first position relative to the mounting member.
Figure 4:
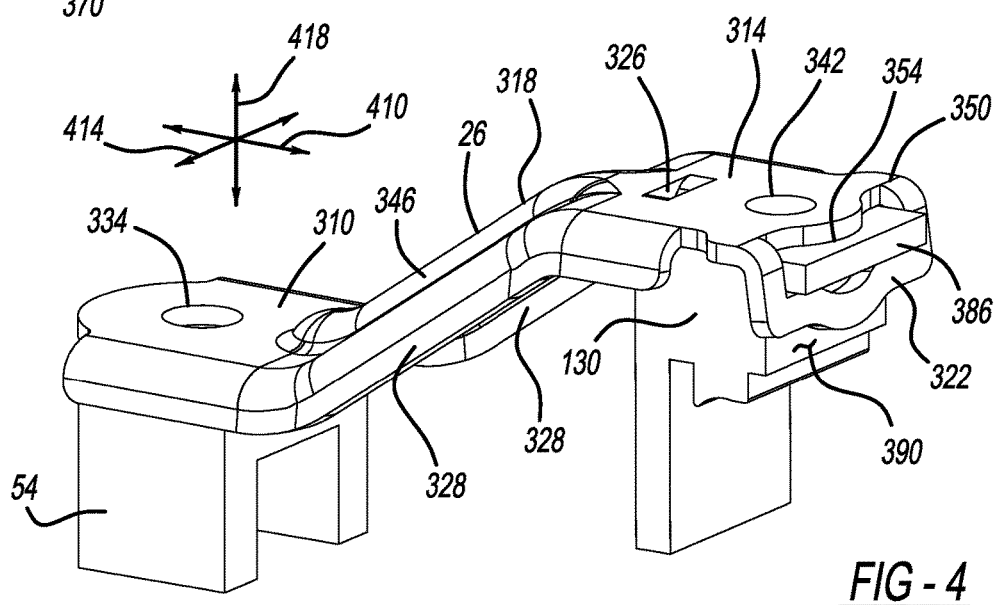
FIG. 4 is a perspective view of a portion of the heat exchanger assembly of FIG. 1, illustrating the bracket in a second position relative to the mounting member.
Figure 5:
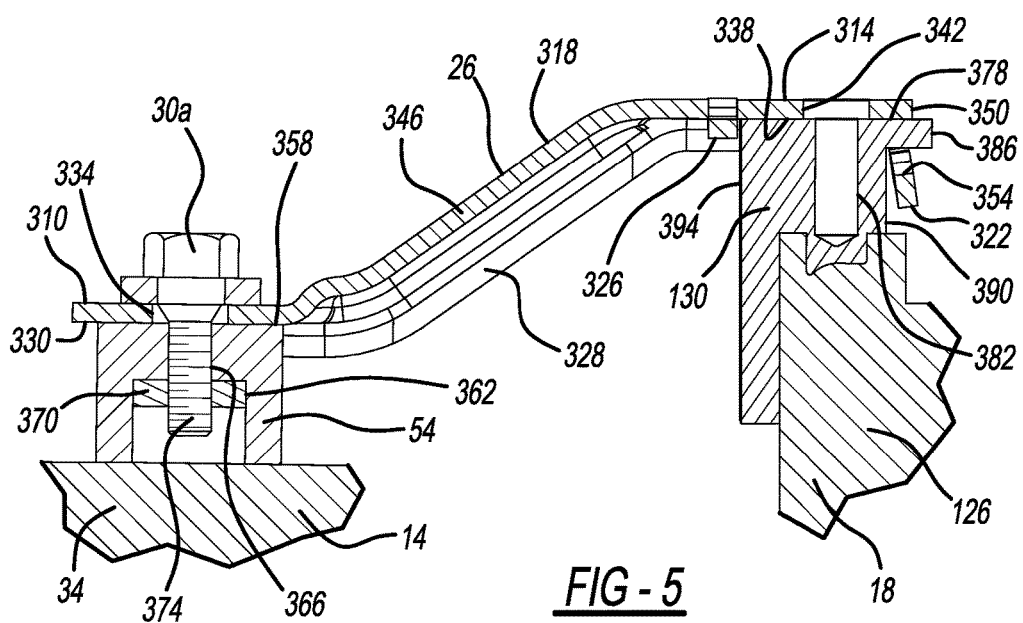
FIG. 5 is a sectional view of a portion of the heat exchanger assembly of FIG. 1, illustrating the bracket and mounting member in the second position.

FIGS. 3-6 generally illustrate a sequence of assembling the first, second, and third heat exchangers 14, 18, 22 with regard to the first bracket 26. In the example provided, the first mounting member 54 and fifth mounting member 130 are fixedly coupled to the first and second heat exchangers 14, 18, respectively (not specifically shown in FIGS. 3 and 4). The nut 370 can be inserted into the nut pocket 362. The first bracket 26 can be positioned generally as shown in FIG. 3 to permit the finger 386 to be inserted into the slot 354. The first bracket 26 can then be pivoted downward about the fifth mounting member 130 until the first bottom face 330 abuts the first upper face 358 and the second bottom face 338 abuts the second upper face 378, as shown in FIGS. 4 and 5.

As shown in FIG. 5, the first one of the fasteners 30a can threadably engage the nut 370 to couple the first bracket 26 to the first heat exchanger 14 and prevent the first bracket 26 from pivoting about the fifth mounting member 130. Thus, the second landing 314, detent 326, and retention member 322 cooperate with the finger 386, second upper face 378, front face 390, and back face 394 to fixedly couple the first mounting member 54 to the first bracket 26 without one of the fasteners 30a, 30b, 30c, 30d, 30e, 30f, 30g. The second, third, and fourth mounting members 58, 62, 66 can also be fixedly coupled to the sixth, seventh, and ninth mounting members 134, 138, 146, respectively, to fixedly couple the first and second heat exchangers 14, 18 together. While the fasteners and the second bracket 32 are illustrated in FIG. 1 as fixedly coupling the second, third, and fourth mounting members 58, 62, 66 to the sixth, seventh, and ninth mounting members 134, 138, 146, respectively, it is appreciated that other constructions (not specifically shown) can include additional brackets that can be similar to the first bracket 26. Thus, the first and second heat exchangers 14, 18 can be shipped or transported in this configuration without one of the fasteners 30a, 30b, 30c, 30d, 30e, 30f, 30g coupling the second landing 314 to the fifth mounting member 130.

Figure 6:
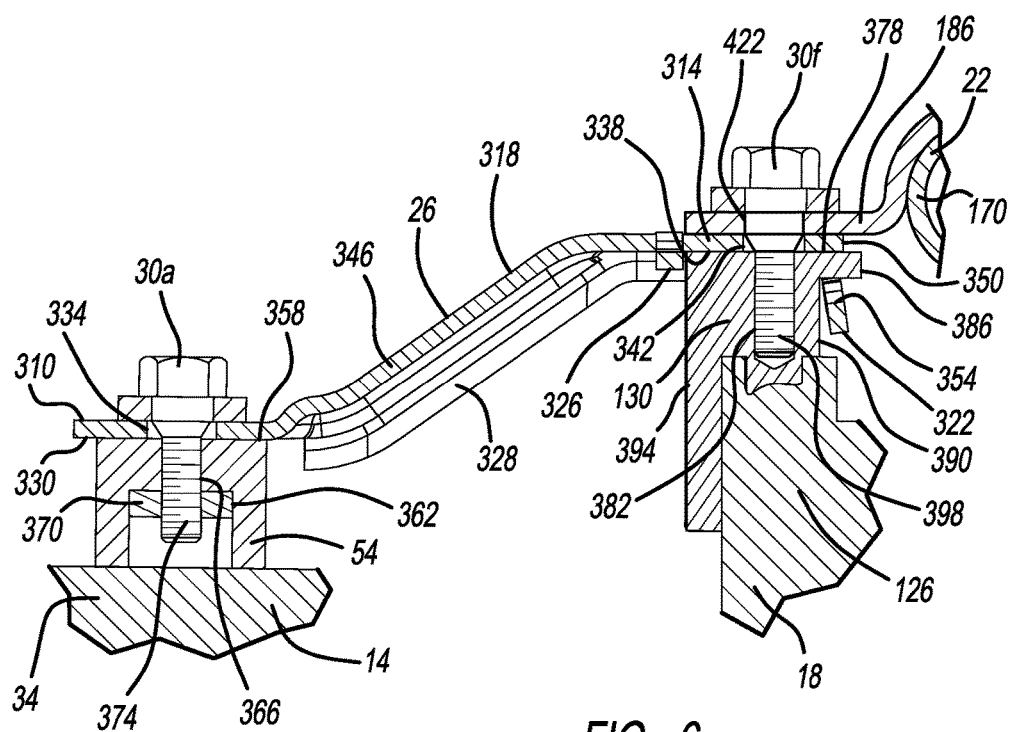
FIG. 6 is a sectional view of a portion of the heat exchanger assembly of FIG. 1, illustrating the third heat exchanger mounted to the bracket and mounting member.

As shown in FIG. 6, the third heat exchanger 22 can be positioned such that a fifth aperture 422 of the tenth mounting member 186 can align with the second aperture 342 of the first bracket 26. The threaded portion 398 of the sixth one of the fasteners 30f can be received through the second and fifth apertures 342, 422 to threadably engage the fifth mounting member 130 in the fourth aperture 382. Thus, the same one of the fasteners 30f fixedly couples the tenth mounting member 186 to the fifth mounting member 130 and the fifth mounting member 130 to the first mounting member 54.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A bracket for a heat exchanger assembly including a first heat exchanger, a second heat exchanger, and a third heat exchanger, the bracket comprising:
   a first landing configured to be fixedly coupled to the first heat exchanger;
   a second landing defining a first aperture configured to receive a first fastener through the second landing;
   a bridge member fixedly coupling the first and second landings; and
   a retention member fixedly coupled to a terminal end of the second landing, the retention member and the second landing defining a slot that is adapted to receive a mounting member of the second heat exchanger, wherein
   the mounting member of the second heat exchanger engages the retention member by being inserted into the slot, and
   the bridge member defines a ridge extending along a middle of the bridge member;
   wherein the first and second landings are substantially parallel and offset from one another; and
   wherein the bridge member extends generally diagonally between the first and second landings.

2. The bracket of claim 1, further comprising a detent defined by the second landing as an opening extending through the second landing, the detent and retention member cooperating to inhibit movement of the second heat exchanger relative to the first heat exchanger.

3. The bracket of claim 1, further comprising a pair of side skirts that extend along opposite sides of the bridge member.

4. The bracket of claim 3, wherein the side skirts extend along opposite sides of at least a portion of the first and second landings.

5. The bracket of claim 1, wherein the first landing defines a second aperture configured to receive a second fastener through the first landing to fixedly couple the first landing to the first heat exchanger.

* * * * *